United States Patent [19]

Fuchs et al.

[11] Patent Number: 4,534,908

[45] Date of Patent: Aug. 13, 1985

[54] WATER-SOLUBLE DISAZO COMPOUNDS AND NEW BIS-(AMINOPHENOXY)-ETHANE COMPOUNDS HAVING FIBER-REACTIVE GROUPS AS THE TETRAZO COMPONENTS, AND USE OF THE DISAZO COMPOUNDS AS DYESTUFFS

[75] Inventors: Hermann Fuchs, Königstein; Klaus Filzinger, Hofheim am Taunus, both of Fed. Rep. of Germany

[73] Assignee: Hoechst Aktiengesellschaft, Frankfurt am Main, Fed. Rep. of Germany

[21] Appl. No.: 535,431

[22] Filed: Sep. 26, 1983

Related U.S. Application Data

[62] Division of Ser. No. 401,408, Jul. 23, 1982.

[30] Foreign Application Priority Data

Jul. 25, 1981 [DE] Fed. Rep. of Germany ....... 3129401

[51] Int. Cl.³ .................... C07C 141/16; C07C 93/14
[52] U.S. Cl. .................... 260/458 C; 260/456 A; 260/453 RY; 260/944; 260/509; 564/341; 564/440; 564/414; 534/642
[58] Field of Search .................... 564/305, 440, 341; 260/456 A, 458 C, 944, 453 RY

[56] References Cited

U.S. PATENT DOCUMENTS

| 1,210,751 | 1/1917 | Anderwert et al. | 564/305 |
| 3,414,579 | 12/1968 | Remy | 260/458 C |
| 3,654,364 | 4/1972 | Meckel et al. | 564/305 |

Primary Examiner—Nicky Chan
Attorney, Agent, or Firm—Curtis, Morris & Safford

[57] ABSTRACT

Water-soluble disazo compounds of the formula (1)

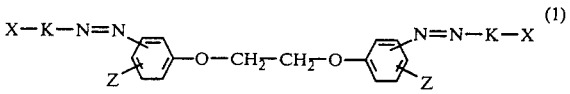

and diamino compounds serving as starting compounds (tetrazo components), of the formula

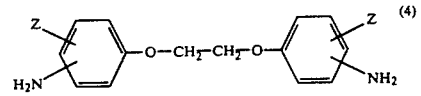

in which the formulae moieties occurring twice, namely Z, K and X, in each case have a meaning identical to one another and the groups Z are bonded to the two benzene nuclei in each case in the ortho- or in each case in the para-position relative to the ethylenedioxy substituent, and the azo groups or amino groups and the groups Z in the benzene nuclei are in each case bonded in the meta-position relative to one another and K is the radical of a coupling component containing a sulfato, carboxy or sulfo group, X denotes a hydrogen atom or a fiber-reactive group and Z is a group of the formula $-SO_2-CH=CH_2$ or $-SO_2-CH_2-CH_2-Y$ in which Y denotes a radical which can be eliminated in aqueous medium under alkaline or acidic conditions or the hydroxy group.

Disazo compounds of the formula (1) can be used as dyestuffs having fiber-reactive properties for dyeing, for example, cellulose fiber material and wool and be prepared by tetrazotizing diamines of the formula (4) and coupling with coupling components evident from the formula (1).

Diamino compounds of the formula (4) are obtained by acetylating a 1,2-di-(o- or p-aminophenoxy)-ethane, chlorosulfonating this bis-acetylamino compound and reducing the sulfonyl chloride groups to sulfinic acid groups, which are then oxyethylated to give β-hydroxyethylsulfonyl groups, which, after deacetylation of acetylamino groups, can be converted in a manner which is in itself known into one of the above-mentioned groups Z, for example into the β-sulfatoethylsulfonyl group by means of a sulfating agent.

3 Claims, No Drawings

WATER-SOLUBLE DISAZO COMPOUNDS AND NEW BIS-(AMINOPHENOXY)-ETHANE COMPOUNDS HAVING FIBER-REACTIVE GROUPS AS THE TETRAZO COMPONENTS, AND USE OF THE DISAZO COMPOUNDS AS DYESTUFFS

This is a division of application Ser. No. 401,408, filed July 23, 1982.

The present invention relates to the industrial field of fiber-reactive disazo dyestuffs.

The present invention provides new, water-soluble, symmetrical disazo compounds of the general formula (1)

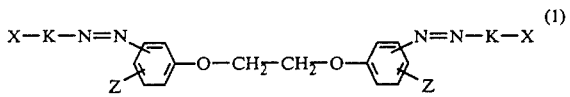

in which the formula moieties occurring twice, namely K, X and Z, in each case have a meaning identical to one another and the groups Z are bonded to the two benzene nuclei in each case in the ortho- or in each case in the para-position relative to the ethylenedioxy substituent, and the azo groups and the groups Z in the benzene nuclei are in each case bonded in the meta-position relative to one another and K is the radical of a coupling component which contains at least one sulfo group (corresponding to the general formula —$SO_3M$ with M of the meaning mentioned below), such as 1, 2, 3 or 4 sulfo groups, preferably 1, 2 or 3 sulfo groups, and/or at least one sulfato group (corresponding to the general formula —$OSO_3M$ with M of the meaning mentioned below), such as 1 or 2 sulfato groups, and/or a carboxy group (corresponding to the general formula —COOM with M of the meaning mentioned below), the sulfo group being preferable among the groups mentioned, M is a hydrogen atom or an alkali metal, such as lithium and, in particular, sodium or potassium, or one equivalent of an alkaline earth metal, such as of calcium, % denotes a hydrogen atom or the radical of a fiber-reactive group and Z is a group of the formula —$SO_2$—CH=$CH_2$ or —$SO_2$—$CH_2$—$CH_2$—Y in which Y denotes an inorganic or organic radical which can be eliminated in an aqueous medium under alkaline or acidic conditions or represents the hydroxy group, and X can also have the meaning of Z.

Unless X is the fiber-reactive group Z itself, the radical X is linked to the radical K via an amino group of the formula —NR— in which R denotes a hydrogen atom or an alkyl group of 1 to 4 C atoms.

The new disazo compounds of the general formula (1) can be in the form of the free acid as well as in the form of their salts. They are preferably in the form of their salts, in particular the alkali metal and alkaline earth metal salts, such as the sodium, potassium and calcium salts. They are preferably used in the form of the alkali metal salts for the dyeing and printing of, preferably, fiber materials.

Examples of inorganic or organic groups Y of the fiber-reactive group —$SO_2$—$CH_2$—$CH_2$—Y are an acyloxy group of an arylsulfonic acid or arylcarboxylic acid, their aryl may be substituted by one or two lower alkyl groups and/or sulfo groups, such as the benzoyloxy, a sulfobenzoyloxy, the benzenesulfonyloxy or a toluenesulfonyloxy group, further an N-arylamidosulfonyloxy group and an optionally substituted phenoxy group and, in particular, a dialkylamino group having alkyl groups of 1 to 4 C atoms each, it being possible for the alkyl groups to have identical or different meanings and each to contain one carboxy group or only one of the alkyl groups to contain a carboxy group or a sulfo group, such as, for example, the diethylamino or the N-methyl-N-β-sulfoethylamino group or the aminodiacetic acid group, and, preferably, for example an alkanoyloxy group having 2 to 5 C atoms in the alkyl radical, such as the acetyloxy group, a lower alkanesulfonyloxy group, such as the methanesulfonyloxy group, a halogen atom, such as the fluorine, chlorine or bromine atom, a thiosulfato group (corresponding to the general formula —S—$SO_3M$ with M of the above-mentioned meaning), a phosphato group (corresponding to the general formula —O—$PO_3M_2$ with M of the above-mentioned meaning), the amidosulfonyloxy group of the formula —O—$SO_2NH_2$ and a sulfato group (corresponding to the general formula —$OSO_3M$ with M of the abovementioned meaning). Among these fiber-reactive Z groups, the vinylsulfonyl group is particularly preferable and, above all, the β-sulfatoethylsulfonyl group.

The aryl radicals mentioned above and also below are preferably the phenyl group or a naphthyl group; if substituted, the phenyl group is substituted, for ex., by one or two substituents from the group comprising methoxy, ethoxy, methyl, ethyl, chlorine, carboxy and sulfo, and the 1- or 2-naphthyl group is substituted, for ex., by a methyl, ethyl, methoxy, ethoxy or carboxy group or a chlorine atom and/or one, two or three sulfo groups.

The expression "lower" used here above and also below means that the group thus designated or the radical thus designated represents an alkyl group of 1 to 4 C atoms or contains an alkyl radical or alkylene radical of 1 to 4 C atoms. Lower alkyl groups which are substituted by an aryl radical are preferably the phenethyl group and in particular the benzyl group.

The coupling components K preferably contain one, two or three sulfo groups. Preferable coupling components K are those which have a phenolic or enolic hydroxy group, or an amino group bonded to an aromatic carbocyclic or aromatic heterocyclic radical.

K is as the radical of a coupling component in particular:

the 1-aminonaphthyl or 2-aminonaphthyl radical which contain at least one sulfo group and, as indicated in the formula (1), can optionally be substituted by X as a fiber-reactive group which can be bonded to K via the amino group —NR— mentioned, and the amino groups of which can in each case be monosubstituted or disubstituted by lower alkyl, by aryl-substituted lower alkyl and/or aryl radicals;

the 1-naphthol or 2-naphthol radical which contain at least one sulfo group and, as indicated in the formula (1), can be optionally substituted by X as a fiber-reactive group which can be bonded to K via the amino group —NR— mentioned, and can be substituted by an amino group or by an amino group substituted by lower alkyl, by aryl-substituted lower alkyl and/or aryl, or by an acylamino group or an acyl-($C_1$-$C_2$)-alkylamino group, it being possible for the acyl radicals in each case to represent, in particular, the radical of an optionally halogen-substituted, such as chlorine-substituted, alkanoic acid having 1-5 C atoms in the alkyl radical, of an optionally halogen-substituted, such as chlorine-substituted, arylalkanoic acid having 1 to 3 C atoms in the alkane part, or of an optionally halogen-substituted, such as chlorine-substituted, arylcarboxylic acid, such as, for example, the acetyl, chloropropionyl, benzoyl, chlorobenzoyl and phenylpropionyl radical, or the radical of an optionally halogen-substituted, such as chlorine-substituted, N-arylcarbamic acid, such as the N-chlorophenylcarbamoyl radical;

an acetoacetylanilide or acetoacetyl-N-naphthylamide radical in which the phenyl radical and the naphthyl radical contains one, two or three sulfo groups and, as indicated in the formula (1), is optionally substituted by X as a fiber-reactive group which can be bonded to K via the amino group —NR— mentioned, and can also be additionally substituted by 1 or 2 substituents, such as, in particular, fluorine, chlorine, bromine, lower alkyl, lower alkoxy, carboxyl, lower carbalkoxy, such as carbethoxy or carbomethoxy, carbamoyl, carbamoyl which is monosubstituted or disubstituted by lower alkyl and/or phenyl, amino and lower N-alkylamino;

the 5-aminopyrazol-4-yl or 5-pyrazolon-4-yl radical which are substituted in the 3-position by methyl, carboxyl, carbamoyl, lower carbalkoxy, such as carbomethoxy and carbethoxy, or phenyl and contain bonded in the 1-position a phenyl nucleus or naphthyl nucleus, the phenyl radical being substituted by 1 or 2 sulfo groups and, as indicated in the formula (1), optionally substituted by X as a fiber-reactive group which can be bonded to K via the amino group —NR— mentioned and it being possible for the phenyl radical to be substituted by 1 or 2 substituents from the group comprising lower alkyl, lower alkoxy, chlorine, bromine, nitro, acetylamino, amino, lower N-alkylamino and carboxyl and the naphthyl radical being substituted by 1, 2 or 3 sulfo groups and, as indicated in the formula (1), optionally substituted by X as a fiber-reactive group which can be bonded to K via the amino group —NR— mentioned and it being possible for the naphthyl radical to be substituted by a substituent from the group comprising lower alkyl, lower alkoxy, nitro, acetylamino, amino, lower N-alkylamino and carboxyl;

a 6-hydroxypyrid-2-one radical containing sulfo groups, or its lower N-alkyl or N-aryl derivatives, it being possible for the pyrid-2-one ring to be further substituted by lower alkyl, X being here hydrogen;

an indole radical containing sulfo groups, which can be substituted in the 2-position by lower alkyl or aryl; and a radical of the general formula (2a) or (2b)

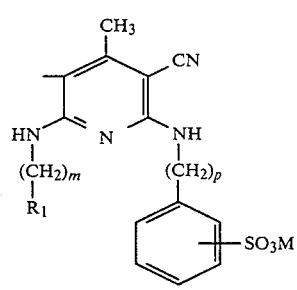

(2a)

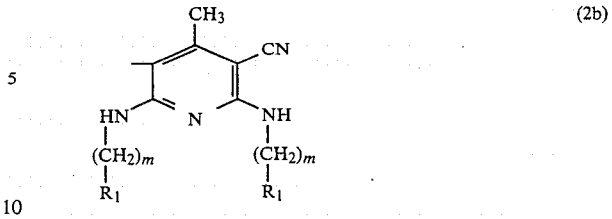

in which m in each case denotes an integer from 2 to 4, p denotes an integer from zero to 4 and $R_1$ denotes a sulfo group or a sulfato group, each $R_1$ and m in the formula (2b) having in each case the same meaning.

—K—X preferably represents a radical of the formula (3a), (3b), (3c), (3d), (3e), (3f), (3g), (3h) or (3i)

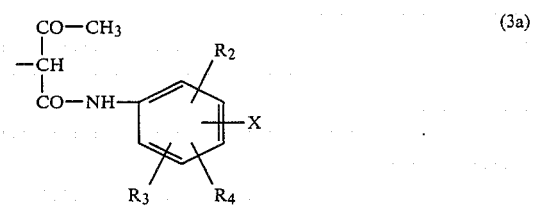

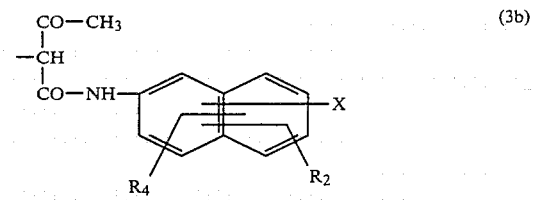

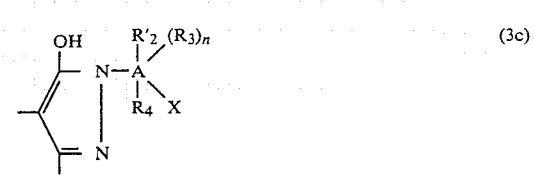

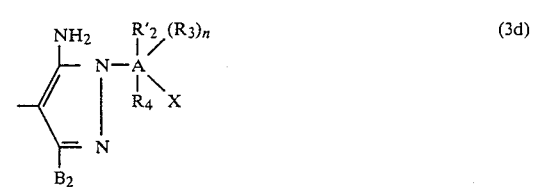

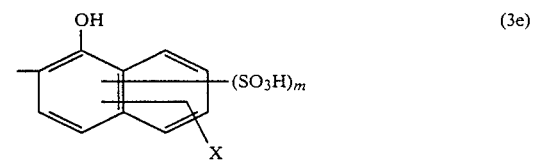

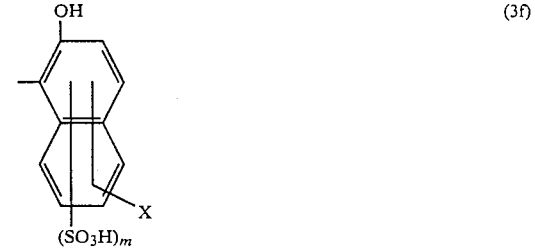

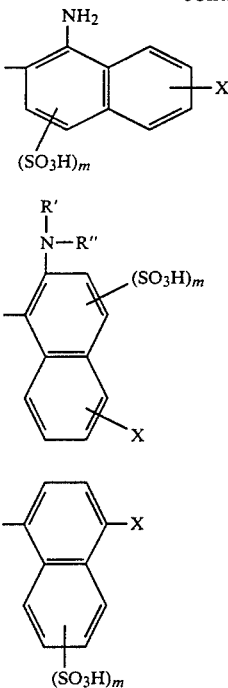

in which the formula radicals have the following meanings: X has the above, particularly preferable, meaning; n is the number 1 or 2, preferably 1; $R_2$ is a hydrogen atom, a lower alkyl group, such as, in particular, a methyl or ethyl group, a lower alkoxy group, such as, in particular, a methoxy or ethoxy group, a chlorine or bromine atom or a sulfo group; $R_3$ is a hydrogen atom, a lower alkyl group, such as, in particular, the methyl or ethyl group, a lower alkoxy group, such as, in particular, the methoxy or ethoxy group, or a chlorine or bromine atom; $R_4$ is a hydrogen atom, a lower alkyl group, such as, in particular, the methyl or ethyl group, a lower alkoxy group, such as, in particular, the methoxy or ethoxy group, or, preferably, a sulfo group; A is the benzene nucleus or a naphthalene nucleus; $R'_2$ is a hydrogen atom, a lower alkyl group, such as, in particular, a methyl and ethyl group, a lower alkoxy group, such as, in particular, a methoxy or ethoxy group, a chlorine or bromine atom, a lower alkanoylamino group, such as an acetylamino group, or a sulfo group; $R'$ is a hydrogen atom or a lower alkyl group; $R''$ is a hydrogen atom, a lower alkyl group or a phenyl group which can be substituted by 1 or 2 substituents of the group comprising lower alkyl, lower alkoxy, chlorine, bromine and sulfo; m represents the number 1 or 2; $B_1$ is a lower alkyl group, preferably methyl group, a carboxy group or a carbomethoxy or carbethoxy group and $B_2$ is a lower alkyl group, preferably the methyl group, a carbomethoxy or carbethoxy group, a carboxamide group or a phenyl group which can be substituted by 1 or 2 substituents from the group comprising lower alkyl, lower alkoxy, chlorine, bromine and sulfo, it being possible for $R'_2$, $R_2$, $R_3$, $R_4$, $R'$, $R''$ and $B_1$ and $B_2$ to be identical to or different from one another and these formula moieties in these formulae (3) of coupling components representing a sulfo group at least once.

Fiber-reactive groups X which can be contained in the disazo compounds, according to the invention, of the general formula (1) are the fiber-reactive radicals, numerously described in the literature, of the carbocyclic and heterocyclic as well as aliphatic series.

The fiber-reactive radical X, provided it is bonded to K via the group —NR— defined above, denotes in particular a known fiber-reactive acyl radical of a lower halogenoalkanoic or lower halogenoalkenoic acid, of a lower halogenoalkanemonocarboxylic or halogenoalkanedicarboxylic acid, or a nitrohalogenobenzenesulfonic or nitrohalogenobenzenecarboxylic acid, of a chloroethylsulfonylbenzenecarboxylic acid, of a halogenocyclobutylcarboxylic, halogenocyclobutenylcarboxylic, halogenocyclobutylacrylic or halogenocyclobutenylacrylic acid or of a halogenoethylsulfonylendomethylenecyclohexanoic acid, a known fiber-reactive acyl radical of a benzoheterocycliccarboxylic or sulfonic acid halogen-substituted in the heterocycle, such as of a halogenobenzoxazolecarboxylic acid or of a halogenobenzothiazolecarboxylic or sulfonic acid, further the fiber-reactive acyl radical of an aromatic-heterocyclic carboxylic or sulfonic acid, the heterocycle of which preferably contains 2 or 3 nitrogen atoms and preferably is a 6-membered heterocycle, thus the pyridazine, pyridazinone, pyrimidine, phthalazine, quinazoline or quinoxaline radical, the heterocycle being substituted by one or two fiber-reactive leaving groups, preferably from the group comprising halogen, such as chlorine and fluorine, lower alkylsulfonyl and sulfo, and it being possible for the heterocycle to be substituted by 1, 2 or 3 further substituents, such as, for example, from the group comprising lower alkyl, lower alkoxy, lower carbalkoxy, lower halogenoalkyl, lower hydroxyalkyl, carboxyl, sulfo, aryloxy, lower alkylmercapto, arylmercapto, lower alkanoyl, cyano, nitro and primary, secondary and tertiary amino groups having aliphatic, heterocyclic and/or aromatic radicals, furthermore the fiber-reactive radical of a heterocycle containing 2 or 3 nitrogen atoms, in particular of a six-membered heterocycle, such as of the pyrimidine, pyridazine or triazine ring, the heterocycle being substituted by one or two fiber-reactive leaving groups, preferably from the group comprising halogen, such as chlorine and fluorine, lower alkylsulfonyl and sulfo, and it being possible for the heterocycle to be substituted by one further substituent, such as, for example, from the group comprising lower alkyl, lower alkoxy, lower carbalkoxy, lower halogenoalkyl, lower hydroxyalkyl, carboxyl, sulfo, aryloxy, lower alkylmercapto, arylmercapto, lower alkanoyl, cyano, nitro and primary, secondary and tertiary amino groups having aliphatic, heterocyclic and/or aromatic radicals.

X can also have the abovementioned meaning of the radical Z.

Examples of fiber-reactive radicals X which are bonded to K via the group —NR— defined above are the chloroacetyl, bromoacetyl, β-chloropropionyl, β-bromopropionyl, α,β-dichloropropionyl or α,β-dibromopropionyl group, the acyl group of a chloromaleic acid, the β-sulfatoethylsulfonyl, the acryloyl, the β-chloroacryloyl, the β-bromoacryloyl, the α-chloroacryloyl, the α-bromoacryloyl, the α,β-dichloroacryloyl, the α,β-dibromoacryloyl, the trichloroacryloyl, the chlorocrotonyl, propionyl, 3,5-dinitro-4-chlorobenzenesulfonyl, 3,5-dinitro-4-chlorobenzenecarbonyl, the 2,2,3,3-tetrafluorocyclobutylacryloyl, 2,2,3,3-tetrafluorocyclobutylcarbonyl, 2,3,3-trifluorocyclobut-1-enylacryloyl, 3-nitro-4-chlorobenzenesulfonyl, 3-nitro-4-chlorobenzenecarbonyl, the β-chloroethylsulfonylendomethylenecyclohexanecarbonyl and 3-β-chloroethylsulfonylbenzoyl group, the 2-chlorobenzoxazolecarbonyl, 2-chlorobenzothiazolecarbonyl and 2-chlorobenzothiazolesulfonyl group, the six-membered heterocyclic acid radicals (acyl radicals) of β-(4,5-dichloropyridazin-6-on-1-yl)propionic acid, 1,4-dichlorophthalazinecarboxylic and 1,4-dichlorophthalazinesulfonic acid, 2,4-dichloroquinazolinecarboxylic and 2,4-dichloroquinazolinesulfonic acid, 2,3-dichloroquinoxalinecarboxylic and 2,3-dichloroquinoxalinesulfonic acid, of 2,6-bis-methylsulfonylpyridine-4-carboxylic acid, 3,6-dichloropyridazine-5-carboxylic acid, 2,4-dichloropyrimidine-6-carboxylic acid, 2,4-dichloropyrimidine-5-carboxylic acid, 2,6-dichloropyrimidine-4- or 2,6-dibromopyrimidine-4-carboxylic and -sulfonic acid, of 2,6-dichloropyrimidine-5- or 2,6-dibromopyrimidine-5-carboxylic and -sulfonic acid, of 2-chlorobenzothiazole-6-carboxylic acid or of 2-chlorobenzothiazole-6-sulfonic acid, the β-sulfatoethylsulfonyl, β-chloroethylsulfonyl, β-phosphatoethylsulfonyl, β-thiosulfatoethylsulfonyl and the vinylsulfonyl group, further the dehalogeno, desulfo or dealkylsulfonyl radical of β-(4,5-dichloropyridazin-6-on-1-yl)-propionic acid, of 1,4-dichlorophthalazinecarboxylic and 1,4-dichlorophthalazinesulfonic acid, 2,4-dichloroquinazolinecarboxylic and 2,4-dichloroquinazolinesulfonic acid, 2,3-dichloroquinoxalinecarboxylic and 2,3-dichloroquinoxalinesulfonic acid, of 2-methylsulfonyl-4-chloro-6-methylpyrimidine, 2,4-bis-methylsulfonyl-6-methylpyrimidine, 2,4,6-tri- or 2,4,5,6-tetra-bromopyrimidine, 2-methylsulfonyl-4,5-dichloro-6-methylpyrimidine, of a 2,4-dichloropyrimidine-5-sulfonic acid, of a 5-nitro- or 5-cyano-2,4,6-trichloropyrimidine, of 2,6-bis-methylsulfonylpyridine-4-carboxylic acid, of 2,4-dichloro-5-chloromethyl-6-methylpyrimidine, 2,4-dibromo-5-bromomethyl-6-methylpyrimidine, 2,4-dichloro-5-bromomethylpyrimidine, 2,4-dibromo-5-chloromethylpyrimidine, 2,5,6-trichloro-4-methylpyrimidine, 2,6-dichloro-4-trichloromethylpyrimidine, 2,4-bis-methylsulfonyl-5-chloro-6-methylpyrimidine, 2,4,6-trimethylsulfonyl-1,3,5-triazine, 2,4-dichloropyrimidine, 3,6-dichloropyrimidine, of 3,6-dichloropyridazine-5-carboxylic acid, of 2,6-dichloro- or 2,6-dibromo-4-carbethoxypyrimidine, 2,4,5-trichlorpyrimidine, of 2,4-dichloropyrimidine-6-carboxylic acid, 2,4-dichloropyrimidine-5-carboxylic acid, of 2,6-dichloropyrimidine- or 2,6-dibromopyrimidine-4-carboxamide, of 2,6-dichloropyrimidine- or 2,6-dibromopyrimidine-4-carboxylic and -sulfonic acid, of 2,6-dichloropyrimidine- or 2,6-dibromopyrimidine-5-carboxamide and -sulfonamide, of 2,6-dichloropyrimidine- or 2,6-dibromopyrimidine-5-carboxylic and -sulfonic acid, of 2,4,5,6-tetrachloropyrimidine, 5-bromo-2,4,6-trichloropyrimidine, 5-acetyl-2,4,6-trichloropyrimidine, 5-nitro-6-methyl-2,4-dichloropyrimidine, 2,4,6-trichloro-5-bromopyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro-1,3,5-triazine, 2,4,6-tribromo-1,3,5-triazine, 2,4,6-trifluoro-1,3,5-triazine or of a 4,6-difluoro-1,3,5-triazine, 4,6-dibromo-1,3,5-triazine and 4,6-dichloro-1,3,5-triazine, it being possible for these dihalogenotriazines to be additionally substituted in the 2-position by a radical from the group comprising aryl, such as phenyl, lower alkyl, such as methyl or ethyl, aliphatic mercapto, such as lower alkylmercapto, aromatic mercapto, such as arylthio, for example phenylthio, aliphatic oxy, such as lower alkoxy, aromatic oxy, such as aryloxy, for example phenoxy and naphthoxy, primary amino and secondary and tertiary amino having aliphatic, heterocyclic and aromatic radicals.

These radicals, which are bonded in the 2-position to the triazine nucleus of the 4,6-dihalogen and can be prepared by reacting with trihalogenotriazines the corresponding compounds, such as those below, are, for example, the ether radicals of, for example, the following aliphatic and aromatic hydroxy compounds: lower thioalkanols, lower alkoxyalkanols, lower alkanols, such as methanol, ethanol and isopropanol, glycolic acid, phenol, chlorophenols, nitrophenols, phenolcarboxylic and phenolsulfonic acids, naphthols and naphtholsulfonic acids, and, for example, the thioether radicals of, for example, aliphatic and aromatic mercapto compounds, such as of thioglycolic acid and thiophenols.

Amino groups which can be contained in the 2-position of the triazine are, in particular, in addition to the primary amino group —NH₂, aliphatic and/or aromatic amino groups which can contain an acylable amino or hydroxy group, such as the amino radicals of hydroxylamine, hydrazine, sulfophenylhydrazine, of ethanolamines and propanolamines, further the amino radicals of methylamine, ethylamine, isopropylamine, methoxyethylamine, methoxypropylamine, dimethylamine, methylphenylamine, ethylphenylamine, chloroethylamine, benzylamine, cyclohexylamine, morpholine, piperidine and piperazine as well as, preferably, of N,N-β-(β'-chloroethylsulfonyl)-ethylamine, likewise of oxygenether compounds which can contain a further acylable amino group, such as of hydroxylamine.

Examples which may be mentioned as preferable of the fiber-reactive radicals X which are bonded to the coupling component K via the amino group mentioned, with R as a rule equal to hydrogen, are the β-chloroethylsulfonylendomethylenecyclohexanecarbonyl group, the 2,3-dichloroquinoxalinecarbonyl group, the β-sulfatoethylsulfonyl, β-chloroethylsulfonyl, β-phosphatoethylsulfonyl, β-thiosulfatoethylsulfonyl and the vinylsulfonyl group (these last-mentioned ethylsulfonyl radicals, which are substituted in the β-position, and the vinylsulfonyl radical being bonded to K via a methylamino or ethylamino group), the demethylsulfonyl or dechloro radical of 2-methylsulfonyl-4,5-dichloro-6-methylpyrimidine, the 2,4-dichloropyrimidine-6-carbonyl radical, the dehalogeno radical of 2,4,6-trifluoro-5-chloropyrimidine, the 2,6-dichloro-1,3,5-triazin-6-yl radical and the 2,4-difluoro-1,3,5-triazin-6-yl radical, it being possible for the halogen atoms present in the 2-position of these dihalogenotriazine radicals to be replaced by a lower alkylmercapto group, a lower alkoxy group, the primary amino group, by the morpholino, piperidino or piperazino radical or by a monosubstituted or disubstituted amino group, the N-substituents in the last-mentioned secondary and tertiary amino group being selected from the set comprising lower alkyl, lower alkyl which is substituted by chlorine, hydroxy, lower alkoxy, lower alkoxyalkoxy, carboxy, sulfo, sulfato, phenyl and phenyl which is substituted by methoxy, methyl, ethoxy, ethyl, carboxy, chlorine and/or sulfo, cyclohexyl, phenyl, naphthyl and phenyl which is substituted by chlorine, methoxy, ethoxy, methyl, ethyl and/or sulfo.

The formula radical X is also preferable in the case where it is bonded directly, without interposition of an amino group, to the aromatic radical of the coupling component, preferably the β-chloroethylsulfonyl, β- thiosulfatoethylsulfonyl, β-phosphatoethylsulfonyl and, in particular, the vinylsulfonyl and β-sulfatoethylsulfonyl group.

The present invention also relates to a process for preparing the abovementioned disazo compounds of the general formula (1), which comprises coupling a tetrazonium salt of a hitherto unknown, and below-described, diamino compound according to the invention and of the general formula (4)

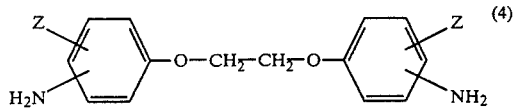
(4)

in which Z in each case has the abovementioned identical meaning and in which the groups Z are bonded to the two benzene nuclei in each case in the ortho- or in each case in the para-position relative to the ethylenedioxy substituent, and the amino groups and the groups Z in the benzene nuclei are in each case bonded in the meta-position relative to one another, with the equivalent (two-fold equimolar) amount of a coupling component of the general formula (5)

H—K—X (5)

in which K and X have the abovementioned meanings.

In the case where Z in formula (4) denotes the β-hydroxyethylsulfonyl group this can be esterified to give the β-sulfatoethylsulfonyl group and this esterification can be carried out, for example, by means of concentrated sulfuric acid during the tetrazotization reaction (here by means of nitrosylsulfuric acid) of the diamines of the general formula (4). However, the esterification can also be carried out with concentrated sulfuric acid or with amidosulfonic acid in pyridine or picoline after the tetrazotization and coupling reaction on the resulting disazo compound, of the general formula (1), containing the β-hydroxyethylsulfonyl group, thus, for example, also in the case where the coupling component of the formula (5) used contained a β-hydroxyethylsulfonyl group as the formula radical X. The last-mentioned esterification is carried out particularly in cases where the disazo compounds, of the general formula (1), produced in the final stage do not contain any radicals which can be split off by the action of acids.

The disazo compounds of the general formula (1) in which X denotes a fiber-reactive radical bonded via the abovementioned and defined amino group of the formula —NR— can also be prepared according to the invention by coupling a tetrazonium salt of an above-described diamino compound according to the invention of the general formula (4) with the equivalent (two-fold equimolar) amount of a coupling component of the general formula (6)

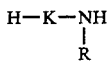
(6)

in which K and R have the abovementioned meanings and then reacting this disazo compound containing in each case an amino group of the formula —NHR defined above in the radicals of the coupling components K with the equivalent (two-fold equimolar) amount of an acylating agent containing the fiber-reactive group X and of the general formula (7)

Hal—X (7)

in which X has the abovementioned meaning and Hal is a halogen atom, such as preferably a bromine and, in particular, chlorine atom, in a procedure, in itself known, of such acylating reactions, such as, for example, at a temperature between 0° and 80° C., preferably between 20° and 60° C., and in the presence of an acid-binding agent, such as, for example, sodium acetate, sodium hydrogen carbonate, sodium carbonate and sodium hydroxide, to give the disazo compound according to the invention of the formula (1).

The coupling reaction of the tetrazotized diamines of the formula (4) with the coupling components of the formula (5) or (6) is carried out in a manner which is in itself known, and with which an expert is familiar, for such coupling reactions, thus, depending on the coupling component used, in a weakly alkaline to acidic, aqueous medium, preferably within a pH range of 1 to 7 and at a temperature between −5° and +25°, with the addition of an acid-binding agent, such as, for example, sodium acetate, sodium hydrogen carbonate, sodium carbonate or aqueous sodium hydroxide solution.

The compounds of the general formula (1) prepared according to the invention are precipitated and isolated from their synthesis solutions, by known methods, thus either by salting out from the reaction medium by means of electrolytes, such as, for example, sodium chloride or potassium chloride, advantageously after adjusting the pH of the synthesis solution to a value within a range of 3.5 to 7.0, or by evaporating, for example by spray drying, the reaction mixture after adjusting the pH to a value between 5.0 and 7.0. In those cases where relatively large amounts of sulfate ions are present in the reaction solution obtained, it is advisable to precipitate these sulfate ions before the spray drying step as sparingly soluble salts, for example as calcium sulfate.

It can also be desirable in some cases to use the solution of the resulting disazo compounds of the formula (1) directly as a liquid composition for dyeing, if necessary after the addition of buffer substances and, if necessary, after possible concentrating.

The present invention, as already mentioned, also relates to new diamino compounds of the abovementioned general formula (4) and to their preparation and use as tetrazo components in the synthesis of disazo compounds. Starting from diamines of the general formula (8)

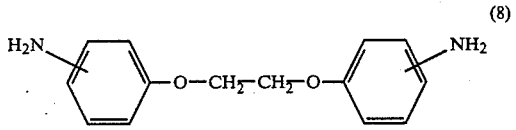
(8)

in which the amino group in the two phenyl radicals is oriented in each case in the ortho-position or in each case in the para-position relative to the ethylenedioxy substituent, they can be synthesized in a manner according to the invention analogously to known procedures by using the following reaction steps:

For example, a diamine of the formula (8) is acetylated to the corresponding N,N'-bisacetyl compound and the latter is converted, for example by means of chlorosulfonic acid and thionyl chloride, as described, for example, in Houben-Weyl, Methoden der Organischen Chemie [Methods of Organic Chemistry], Volume IX, page 578 (1955), preferably at a temperature between 40° and 100° C., in particular between 60° and 70° C., into the sulfonyl chloride of the formula (9a) or (9b) shown below:

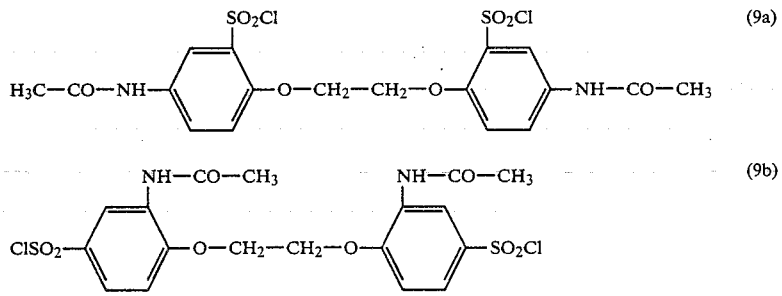

These are reduced, as known from Houben-Weyl, Methoden der Organischen Chemie [Methods of Organic Chemistry], Volume IX, page 306 (1955), for example by means of an alkali metal sulfite, in particular sodium sulfite, in the presence of an alkali metal carbonate, such as sodium carbonate, in an aqueous solution, preferably at a temperature between 0° C. and 60° C., in particular 20° and 25° C., and at a pH value between 7.0 and 10.0, preferably between 8.0 and 8.5, to the corresponding sulfinic acids, which can be oxyethylated with ethylene oxide in the presence of aqueous sulfuric acid or with ethylene chlorohydrin, for example, analogously to the process described in Belgian Pat. No. 747,418, at a temperature within a range of 30° and 70° C., preferably between 50° and 60° C., and at a pH value between 4.5 and 9.0, in particular between 7.0 and 7.5, to give the β-hydroxyethylsulfonyl compounds of the formula (10a) or (10b)

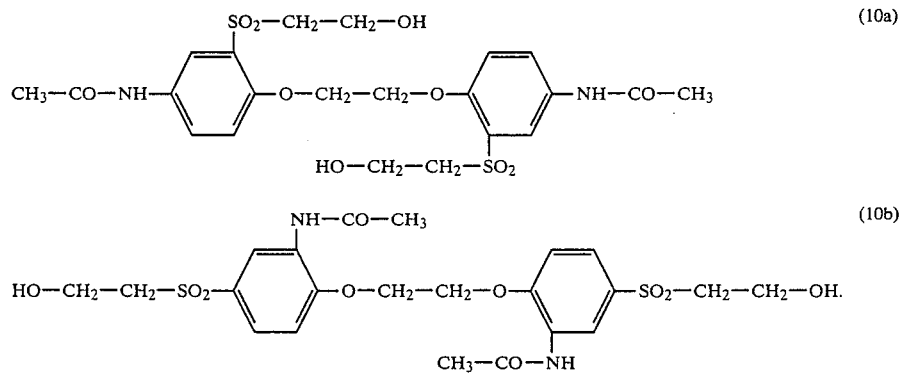

After deacetylation by means of inorganic acids, such as, for example, aqueous hydrochloric acid or aqueous sulfuric acid, diamines of the above-defined formula (4)

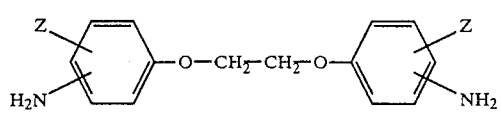

in which in this case Z in each case denotes the β-hydroxyethylsulfonyl group are obtained from (10a) and (10b) respectively.

To prepare diamines of the general formula (4) in which Y as a radical of the group Z denotes, in accordance with the abovementioned definition, a chlorine atom or the ester radical of an organic or inorganic acid, such as, for example, a sulfato, phosphato, lower alkylsulfonyloxy or arylsulfonyloxy radical, the precursors (10a) and (10b) are reacted analogously to a manner known to an expert with an inorganic or organic acid halide, such as, for example, thionyl chloride, phosphorus halides, alkylsulfonyl chlorides, arylsulfonyl chlorides, amidosulfonic chlorides, N-alkylamidosulfonic acid chlorides, N-arylamidosulfonic acid chlorides, or with sulfuric acid or phosphoric acid, and the acetylamino groups are then, or optionally simultaneously when sulfuric acid or phosphoric acid is used, hydrolyzed to the amino groups.

Diamines of the general formula (4) in which Z denotes the group $-SO_2-CH_2-CH_2-OSO_3H$ are preferably prepared by esterifying, analogously to a known method (with 95-100% strength sulfuric acid or $SO_3$-containing sulfuric acid at a temperature between $-5°$ C. and $+50°$ C., preferably 20° and 25° C.), diamines of the formula (4) which can be obtained via the compounds (10a) or (10b) with Z as a β-hydroxyethylsulfonyl group. The sulfato compounds thus formed, of the general formula (4), can either be isolated from their acidic solutions, diluted with ice, at a temperature of at most 20° C., preferably to $+10°$ C., as internal ammonium salts or obtained from said solutions after neutralization with, for example, an alkali metal hydroxide, in particular sodium hydroxide or potassium hydroxide, in the form of their alkali metal salts, in particular sodium salts or potassium salts, by spray-drying.

Diamines according to the invention and of the general formula (4) in which Z denotes the vinylsulfonyl group can preferably be obtained from the mentioned sulfato salts by reaction with aqueous alkalis, preferably aqueous sodium hydroxide, analogously to known process conditions. These vinyl sulfone compounds can be used for preparing further diamines of the formula (4), for example those diamines of the formula (4) in which Y represents the thiosulfato, the phenoxy or an optionally sulfo- or carboxy-substituted lower dialkylamino group, by adding to the vinylsulfonyl group either, in a weakly acidic medium at a pH value of preferably 5–7, an alkali metal thiosulfate, in particular sodium thiosulfate or potassium thiosulfate, or, in a weakly alkaline to neutral medium at a pH value within a range of 7 to 10, a phenol or a corresponding optionally substituted dialkylamine.

Disazo compounds according to the invention of the general formula (1) have valuable dyestuff properties which, owing to their radicals Z and the radicals X which may be present, have fiber-reactive properties. The new compounds are preferably used for coloring (in the general sense) of materials containing hydroxy and/or carbonamide groups, for example in the form of sheet structures, such as paper and leather or plastic sheeting, or in the mass, such as polyamide and polyurethane, in particular of such materials in fiber form.

The present invention thus also relates to the use of compounds of the general formula (1) for dyeing (including spin-dyeing and printing) these materials and to processes for coloring such materials in procedures which are in themselves customary and in which a compound of the general formula (1) is used as a colorant. The materials are preferably used in the form of fiber materials, in particular in the form of textile fibers.

Materials containing hydroxy groups are natural or synthetic materials containing hydroxy groups, such as, for example, cellulose fiber materials or their regenerated products or polyvinyl alcohols. Cellulose fiber materials preferably are cotton but also other vegetable fibers, such as linen, hemp, jute and ramie fibers, or regenerated cellulose fibers, such as, for example, viscose staple and viscose rayon. Examples of materials containing carbonamide groups are synthetic and natural polyamides and polyurethanes, in particular in the form of fibers, for example wool and other animal hairs, silk, leather, polyamide-6,6, polyamide-6, polyamide-11 and polyamide-4.

The azo compounds according to the invention produce, for example, on cellulose fibers by the exhaust method, with the use of a wide variety of added alkalis from long liquor, dyeings having very good color yield and very good wet fastness properties. Compounds of the general formula (1) dye cellulose fibers with the use of the known padding methods likewise with excellent color yields and very good wet fastness properties, it being possible for these compounds to be fixed by means of added alkalis by leaving the dyeings at room temperature, by steaming or by using dry heat.

Deep prints having well-delineated contours and a clear white ground and very good wet fastness properties are also obtained by the customary printing processes for cellulose fibers,—one-step—for example by printing with a print paste containing sodium bicarbonate or another acid-binding agent and subsequent steaming at 101°–103° C.,—or two-step—for example by printing with a neutral or weakly acidic print paste and subsequent fixing either by passing through a hot electrolyte-containing alkaline bath or by overpadding with an alkaline electrolyte-containing padding liquor and subsequent leaving or steaming or treatment with dry heat of the material overpadded. The outcome of the prints depends only to a small extent on varying conditions of fixing. The degrees of fixing obtained with the dyestuffs according to the invention are high not only in dyeing but also in printing.

Superheated steam or saturated steam of temperatures up to 160° C. can likewise be used as the customary steam of 100°–103° C. In fixing by means of dry heat in the customary thermofixing processes, hot air of 120°–200° C. is used.

Examples of agents which are acid-binding and effect the fixing of the compounds according to the invention on the cellulose fibers are water-soluble basic salts of alkali metals and also alkaline earth metals of inorganic or organic acids or compounds which liberate alkali in the heat. To be mentioned in particular are the alkali metal hydroxides and alkali metal salts of weak to medium-strong inorganic or organic acids, the sodium and potassium compounds being preferably intended among the alkali metal compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, waterglass and trisodium phosphate. The treatment of the compounds according to the invention with the acid-binding agents, if appropriate with the action of heat, chemically bonds the former to the cellulose fiber.

Polyamide fibers are customarily dyed from an acidic medium. Thus, for example, acetic acid or acetic acid and ammonium acetate or sodium acetate can be added to the dyebath to obtain the pH value desired. To obtain acceptable levelness of the dyeings it is advisable to add customary leveling agents, for example those which are based on a reaction product of cyanuric chloride with the three-fold molar amount of an aminobenzenesulfonic and/or aminonaphthalenesulfonic acid or on a reaction product of a fatty amine, such as, for example, stearylamine, with an alkylene oxide, such as, for example, ethylene oxide. The dyeings can customarily be carried out at temperatures of 60°–105° C., preferably in the exhaust method, in particular at the boiling temperature of the dyebath, or also in a pressure dyeing apparatus at temperatures up to 120° C.

The dyeings or prints obtainable with compounds of the general formula (1) have, in particular on cellulose fiber materials, very good fastness properties; of these the most important manufacturing and end use fastness properties are to be mentioned in particular, such as the light fastness, the wash fastness, for example at 60° C. or 95° C., the fastness to fulling under acidic and alkaline conditions, the water fastness, the seawater fastness, the fastness to acid cross-dyeing, the alkaline and acid perspiration fastness as well as the fastness to pleating, ironing and rubbing. When used in printing processes, the non-fixed portions of compounds of the formula (1) are very readily washed out, so that dyeing of the white ground during rinsing with water is avoided.

Those compounds according to the invention are particularly preferable which have the general formula (1a)

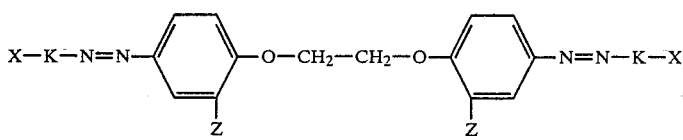

(1a)

in which K, Z and X have the abovementioned, particularly preferable meanings. They are distinguished by excellent affinity and build-up capacity in the dyeing of natural and regenerated cellulose fibers, high degrees of exhaustion and very good fixing values being obtained.

Among particular compounds according to the invention and corresponding to the general formula (1) in particular those can be emphasized which are described in the Examples 8, 9, 11, 13 and 18.

The examples which follow serve to illustrate the invention. The parts mentioned therein are parts by weight, and the percentage data are percentages by weight, unless otherwise stated. Parts by weight relate to parts by volume as the kilogram relates to the liter.

Compounds described in the examples below by means of a formula are shown in the form of the free acids; they are generally prepared and isolated in the form of their sodium salts or potassium salts and used for dyeing in the form of their salts. Similarly, the starting compounds and components mentioned in the form of the free acid in the following examples, in particular of the tabled examples, can be used as such or in the form of their salts, preferably their alkali metal salts, such as the sodium or potassium salts, in the synthesis.

EXAMPLE 1

(a) 250 parts of thionyl chloride are added dropwise to a solution of 328.4 parts of ethylene glycol bis-(4-acetaminophenyl)ether in 1,100 parts of chlorosulfonic acid. The temperature of the reaction mixture is adjusted to 65° C., and the batch is discharged, after reacting for three hours, with stirring onto 6,000 parts of ice, ethylene glycol bis-(4-acetamino-2-chlorosulfonylphenyl)ether precipitating as the reaction product. After the product has been filtered off with suction and washed with ice-water, the product is added to a mixture of 500 parts of water, 572 parts of 40% strength aqueous sodium bisulfite and 88 parts of sodium hydroxide at 20° C., while, simultaneously, the pH of the mixture is maintained at a value of 8.0 to 8.5 by means of 33% strength aqueous sodium hydroxide.

(b) The solution of the bis-sulfinic acid formed,—ethylene glycol bis-(4-acetamino-2-sulfinophenyl)ether-,—is cooled down with stirring to +10° C., 360 parts of ethylene oxide is added, and the mixture is heated for 2 hours at 50° C. and then for one hour at 60° C., during which period the pH of the reaction mixture is maintained at a value of 7.0 to 7.5 by means of 20% strength sulfuric acid. The batch is cooled down to 10° C., a further 180 parts of ethylene oxide are added, and the reaction mixture is heated at 60° C. while the pH is maintained at a constant value of 7.0 to 7.5. After the reaction is complete, the batch is cooled down to 20° C., and the precipitated ethylene glycol bis-(4-acetamino-2-β-hydroxyethylsulfonylphenyl)ether is filtered off and washed with ice-water.

(c) The moist filter cake is stirred into 1,500 parts of 5% strength sulfuric acid and heated under reflux for 3 hours. The resulting clear solution is neutralized at 70°–80° C. by means of concentrated aqueous sodium hydroxide up to a pH value of 6.5 and cooled down with stirring to 15°–20° C., ethylene glycol bis-(4-amino-2-β-hydroxyethylsulfonylphenyl)ether precipitating. The dried product melts at 194°–196° C.

Elemental analysis: Calculated: C 46.94%; H 5.25%; N 6.08%; Found: C 46.50%; H 5.25%; N 6.20%

EXAMPLE 2

(a) 460.5 parts of ethylene glycol bis-(4-amino-2-β-hydroxyethylsulfonylphenyl)ether are stirred at 20°–25° C. into 1,850 parts of 100% strength sulfuric acid. The resulting solution is left to stand for 12 hours with the exclusion of atmospheric moisture. The batch is then discharged onto 15,000 parts of ice, and the pH of the mixture is adjusted to a value of 1.2 by means of calcium carbonate and then, by means of sodium carbonate, to a value of 6.5. The mixture is heated to 60° C., precipitated calcium sulfate is separated off by filtration, and ethylene glycol bis-(4-amino-2-β-sulfatoethylsulfonylphenyl)ether is isolated as the disodium salt by spray drying from the filtrate obtained.

(b) If the solution obtained according to (a) is stirred into an amount of ice which is such that the temperature does not exceed a value of 10° C., 548 parts (=88% of theory) of ethylene glycol bis-(4-ammonio-2-β-sulfatoethylsulfonylphenyl)ether as an internal salt precipitate as the product in the form of crystals.

EXAMPLE 3

Concentrated aqueous sodium hydroxide is added up to a pH value of 12.0 to a solution of 62.0 parts of ethylene glycol bis-(4-amino-2-β-sulfatoethylphenyl)ether in the form of its disodium salt in water. 41.0 parts of ethylene glycol bis-(4-amino-2-vinylsulfonylphenyl)ether precipitate as a crystalline compound. After filtration and drying, the product melts at 187°–189° C.

EXAMPLE 4

500 parts of sodium thiosulfate pentahydrate are added to a suspension, in 4,000 parts of water, of 424.5 parts of ethylene glycol bis-(4-amino-2-vinylsulfonylphenyl)ether, and the mixture is heated with stirring to 70°–75° C. The pH is maintained at a pH value of 5.7 by means of 50% strength acetic acid until the suspension has completely clarified. Ethylene glycol bis-(4-amino-2-β-thiosulfatoethylsulfonylphenyl)ether formed is precipitated from the resulting solution by means of potassium chloride in the form of the potassium salt.

EXAMPLE 5

328.4 parts of ethylene glycol bis-(2-acetaminophenyl)ether are reacted in accordance with Example 1 with 1,100 parts of chlorosulfonic acid and 250 parts of thionyl chloride to give ethylene glycol bis-(2-acetamino-4-chlorosulfonylphenyl)ether. After its isolation, this compound is reduced in the method described in Example 1 by means of 572 parts of 40% strength aqueous sodium bisulfite to ethylene glycol bis-(2-acetamino-4-sulfinophenyl)ether and, analogously to the method in Example 1, the resulting bis-sulfinic acid is converted, by means of 540 parts of ethylene oxide, into ethylene glycol bis-(2-acetamino-4-hydroxyethyl-sulfonylphenyl)ether. The crude product, as detailed in Example 1, is deacetylated by means of 1,500 parts of 5% strength aqueous sulfuric acid and ethylene glycol bis-(2-amino-4-β-hydroxyethylphenyl)ether is formed. This product, after drying, melts at 144°–146° C.

Elemental analysis: Calculated: C 46.94%; H 5.25%;

mixture is heated to 65° C., calcium sulfate is filtered off, and the disazo compound is precipitated from the filtrate by salting out by means of sodium chloride. After the product has been filtered off with suction, dried and ground, a dark red powder is obtained which contains electrolyte, predominantly sodium chloride, and alkali metal salt, predominantly the sodium salt, of the compound of the following formula

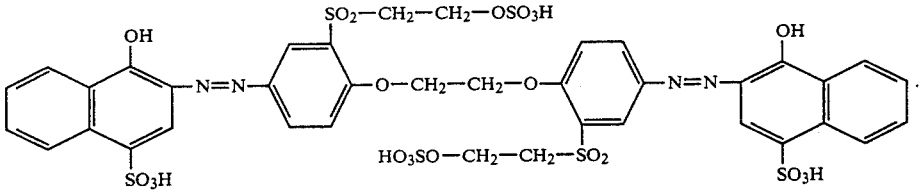

N 6.08%; S 13.92%; Found: C 46.40%; H 5.20%; N 6.10%; S 13.60%

EXAMPLE 6

460.5 parts of ethylene glycol bis-(2-amino-4-β-hydroxyethylsulfonylphenyl)ether are stirred at 20°–25° C. into 1,850 parts of 100% strength sulfuric acid; the resulting solution is allowed to stand for 12 hours with the exclusion of atmospheric moisture and is then discharged with stirring onto 15,000 parts of ice. The mixture is adjusted with calcium carbonate to a pH value of 1.2, and then with sodium carbonate to a pH value of 6.5, and heated to 60° C. The precipitated calcium sulfate is filtered off, and ethylene glycol bis-(2-amino-4-β-sulfatoethylsulfonylphenyl)ether is isolated from the filtrate obtained as the disodium salt by spray drying.

EXAMPLE 7

150 parts of ice are added to a solution of 46.0 parts of ethylene glycol bis-(4-amino-2-β-hydroxyethylsulfonyl-phenyl)ether in 75 parts of 31% strength aqueous hydrochloric acid and 250 parts of water, and the ether is tetrazotized by adding 40 parts of 5N sodium nitrite solution. 44.8 parts of 1-naphthol-4-sulfonic acid are added to the resulting solution of the tetrazonium compound, and the pH of the reaction mixture is adjusted by means of sodium carbonate first to a value of 4.0 and after one hour's reaction time to a value of 6.5.

The disazo compound obtained is salted out with sodium chloride, filtered off with suction and dried. The finely ground product is stirred into the 6-fold amount by weight of 100% strength sulfuric acid with the exclusion of atmospheric moisture, during which step the temperature of the reaction mixture should be 30° to 35° C. After stirring for 12 hours, the solution is slowly stirred into ice, the temperature being maintained at +5° C. by the addition of ice at a uniform rate. The pH of the resulting mixture is then adjusted by means of calcium carbonate to a value of 1.2 and then neutralized to a pH value of 6.5 by means of sodium carbonate. The The compound has very good dyestuff properties and dyes, by the dyeing and printing methods customary for reactive dyestuffs, cellulose fiber materials, such as cotton, in deep, clear scarlet shades having a high dyeing yield; these dyeings and prints have very good end-use and manufacturing fastness properties, such as, in particular, very good wet fastness properties.

EXAMPLE 8

46.0 parts of ethylene glycol bis-(4-amino-2-β-hydroxyethylsulfonylphenyl)ether are stirred at 25°–30° C. into 320 parts of 100% strength sulfuric acid. After stirring for 8 hours, 64 parts of 40.1% strength nitrosyl-sulfuric acid are added dropwise at 20° to 25° C., and the resulting reaction mixture is stirred for another hour. The solution of the tetrazonium compound formed is then discharged with vigorous stirring onto 1,200 parts of ice, and the resulting suspension is adjusted by means of sodium carbonate to a pH value of 1, the temperature being maintained at a maximum of 15° C. 60.8 parts of 1-naphthol-3,6disulfonic acid are then added; the pH value of the reaction mixture is increased by means of sodium carbonate to 6.0. The resulting suspension is diluted to about 5,500 parts, and the disazo compound formed is filtered off with suction after about 5 hours' reaction time. After the filter cake has been dried and ground, a red powder is obtained which contains electrolyte salt (predominantly sodium sulfate) and the alkali metal salt, predominantly the sodium salt, of the compound of the formula

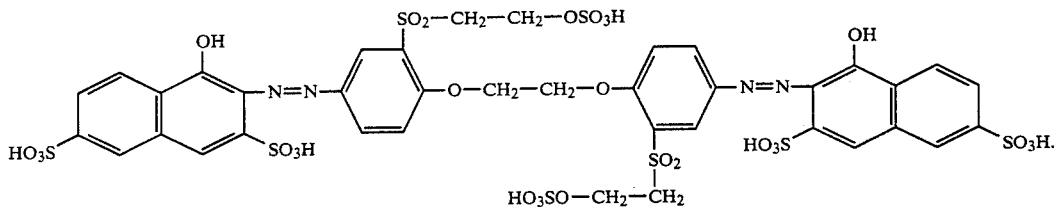

The disazo compound according to the invention dyes cellulose fiber materials, such as cotton, from an aqueous dyebath in the presence of sodium bicarbonate, sodium carbonate or sodium hydroxide in a deep clear scarlet shade having very good wet fastness properties and very good light fastness.

Compared to structurally comparable monoazo compounds based on 1-aminobenzene-β-sulfatoethyl sulfone derivatives as diazo components, a higher dyeing yield and better wet fastness values on the fiber can be obtained by means of the disazo compound according to the invention.

EXAMPLE 9

If the method described in Example 8 is carried out using 43.8 parts of N-methyl-4-methyl-6-hydroxypyrid-2one-3-sulfonic acid instead of 1-naphthol-3,6-disulfonic acid, a yellow-brown powder is obtained which predominantly contains the sodium salt of the disazo compound of the formula

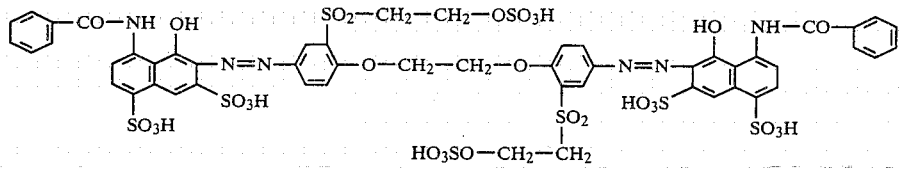

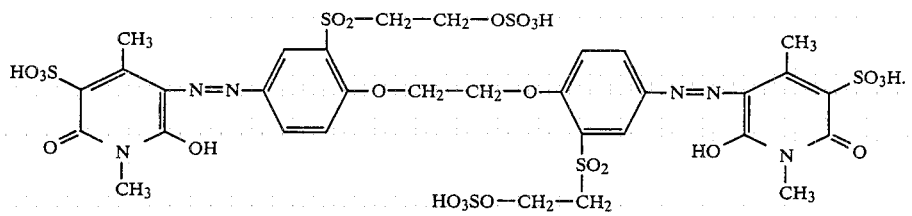

This disazo compound according to the invention likewise has very good dyestuff properties. Applied from an aqueous dyebath in the presence of acid-binding agents, it produces on cellulose fiber materials, such as on cotton, deep yellow dyeings having very good wet fastness properties and very good light fastness.

Compared to monoazo compounds obtained by using 1-aminobenzene-β-sulfatoethyl sulfone derivatives as diazo component, the compound according to the invention has considerably higher dyeing yields, regardless of whether the material to be dyed is dyed by various methods, for example by the pad-batch, pad-steam or pad-thermofixing method, one-step, ie. in the presence of alkali, or two-step, ie. by overpadding with alkali, or by an exhaust method.

EXAMPLE 10

46.0 parts of ethylene glycol bis-(4-amino-2-β-hydroxyethylsulfonylphenyl)ether are tetrazotized in accordance with the method given in Example 8, and the resulting solution of the tetrazo compound is discharged onto 1,200 parts of ice. 84.6 parts of 8-N-benzoylamino-1-naphthol-3,5-disulfonic acid are added to this suspension after the setting of a pH value of 1.0 by means of calcium carbonate, the pH of the reaction mixture is adjusted to a value of about 6 by means of sodium carbonate, the reaction solution, after the coupling at 65° C. is complete, is separated by filtration from precipitated calcium sulfate, and the disazo compound according to the invention is either isolated as an electrolyte-containing powder by spraying of the solution at 220° to 240° C. or salted out by the addition of sodium chloride from the filtrate.

The sodium salt of the disazo compound of the formula is obtained. This disazo compound according to the invention has very good dyestuff properties and dyes, for example, cellulose fiber materials, such as cotton, by the dyeing and printing methods and fixing processes customary for reactive dyestuffs from an aqueous dyebath containing sodium carbonate in brilliant bluish red shades. The dyeings and prints exhibit very good dyeing yields and very good end-use and manufacturing fastness properties, such as, in particular, very good light fastness and wet fastness.

EXAMPLE 11

40 parts of an aqueous 5N sodium nitrite solution are added to a neutral solution of 62 parts of ethylene glycol bis-(4-amino-2-β-sulfatoethylsulfonylphenyl)ether, and the mixture is slowly added to a mixture f 150 parts of ice and 70 parts of 31% strength hydrochloric acid. After stirring for about 30 minutes, excess nitrous acid is decomposed by adding a small amount of amidosulfonic acid, 56.8 parts of 1-(4-sulfophenyl)-pyrazol-5-on-3-carboxylic acid are added, and the pH of the coupling mixture is adjusted to a value of 6.0 by means of sodium carbonate. After two hours' reaction, the disazo compound according to the invention is salted out by adding sodium chloride, filtered off, dried and ground.

A yellow-brown powder (containing electrolyte salt, predominantly sodium chloride) of alkali metal salt, predominantly the sodium salt, of the compound of the formula

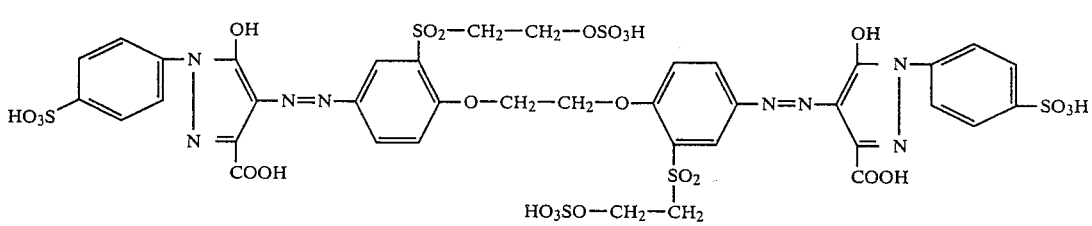

is obtained. The compound has very good dyestuff properties and produces on printing of, for example, cotton or regenerated cellulose by the methods customary for reactive dyestuffs deep yellow prints having a very good color yield and very good wet fastness properties.

Wool is dyed neutral yellow from a weakly acidic dyebath containing acetic acid and buffered with ammonium acetate, the disazo compound according to the invention exhausting very well and producing, in the presence of fatty amine oxyethylates, deep dyeings having excellent levelness and very good wet fastness properties.

EXAMPLE 12

150 parts of ice, 70 parts of 31% strength aqueous hydrochloric acid and then 40 parts of 5N sodium nitrite solution are added with stirring to a neutral solution of 62 parts of ethylene glycol bis-(2-amino-4-β-sulfatoethylsulfonylphenyl)ether in 250 parts of water. The reaction mixture is stirred for a further 30 minutes, and, as customary, excess nitrous acid is destroyed. 64.6 parts of 1-(2,5-dichloro-4-sulfophenyl)-3-methyl-pyrazol-5-one are added to the solution of the tetrazonium compound, and the pH value of the coupling mixture is maintained at 6.5 until the coupling reaction is complete. The disazo compound according to the invention is then salted out with sodium chloride, filtered off and dried.

A powder (which contains electrolyte salts, predominantly sodium chloride) of alkali metal salt, predominantly sodium salt, of the compound of the formula yellow shades having very good wet fastness properties and good to very good light fastness properties.

EXAMPLE 13

150 parts of ice are added to a solution of 42.4 parts of ethylene glycol bis-(4-amino-2-vinylsulfonylphenyl)ether in a mixture of 250 parts of water and 70 parts of 31% strength aqueous hydrochloric acid, and 40 parts of an aqueous 5N sodium nitrite solution are then added dropwise. The reaction mixture is stirred for approximately a further 30 minutes, and, as customary, excess nitrous acid is then destroyed. An aqueous solution of the sodium salt of 113.6 parts of 8-N-[4-chloro-6-(3-sulfophenylamino)-1,3,5-triazin-2-yl]amino-1-naphthol-3,6-disulfonic acid is added to the solution of the tetrazonium compound. The pH value of the resulting mixture is adjusted to 6.0 by means of sodium carbonate, and the resulting bluish-red disazo compound according to the invention is precipitated, after the coupling reaction is complete, with potassium chloride, filtered off with suction, dried and ground.

A dark red powder of alkali metal salt, predominantly potassium salt, of the compound of the formula

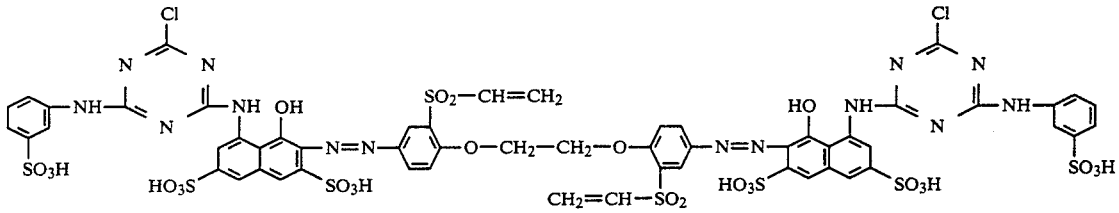

is obtained. The compound has very good dyestuff properties and produces by the application and fixing methods customary for fiber-reactive dyestuffs on cellulose fiber materials in very good yield dyeings and prints having clear bluish-red shades of very good end-use and manufacturing fastness properties, such as, in particular, very good wet fastness properties.

EXAMPLE 14

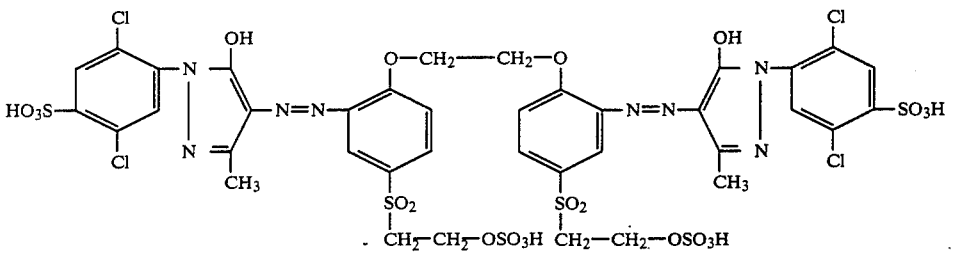

is obtained. The compound has very good dyestuff properties and dyes, in the presence of alkali, by the dyeing and printing methods and fixing processes customary for reactive dyestuffs cellulose fiber materials, such as cotton or viscose staple, in briliant greenish If the procedure according to the invention is followed analogously to Example 13 and 8-N-[4-chloro-6-(3-sulfophenylamino)-1,3,5-triazin-2-yl]-amino-1-naphthol-3,6-disulfonic acid is replaced there by 107 parts of 8-N-[4-fluoro-6-(3-sulfophenylamino)-1,3,5-triazin-2-yl]-amino-1-naphthol-3,6-disulfonic acid, the potassium salt of the disazo compound of the formula

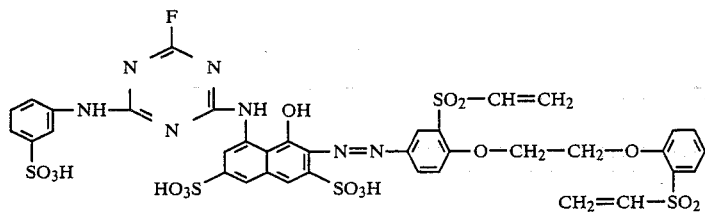
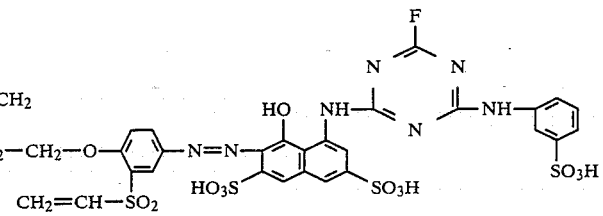

is obtained. This compound according to the invention likewise has very good dyestuff properties and produces on cellulose fiber materials dyeings and prints having clear bluish-red shades in excellent dyeing yields. They have very good end-use and manufacturing fastness properties, such as, in particularly, good wet fastness properties.

EXAMPLE 15

40 parts of an aqueous 5N sodium nitrite solution are added to a solution of the sodium salt of 65.2 parts of ethylene glycol bis-(4-amino-2-$\beta$-thiosulfatoethylsulfonylphenyl)ether in 300 parts of water; the tetrazonium compound is then formed by stirring in a mixture of 200 g of ice and 70 parts of 30% strength aqueous hydrochloric acid. The mixture is stirred for a further 30 minutes, and excess nitrous acid is then decomposed. 60.8 parts of 1naphthol-3,8-disulfonic acid are added, the pH value of the reaction mixture is adjusted to 6.0 by means of sodium carbonate, and, after the coupling reaction is complete, the disazo compound according to the invention is precipitated with sodium chloride, filtered off with suction, dried and ground.

Electrolyte-containing alkali metal salt, predominantly the sodium salt, of the compound of the formula

EXAMPLE 16

150 parts of ice are added to a solution of 49.7 parts of ethylene glycol bis-(4-a mino-2-$\beta$-chloroethylsulfonylphenyl)ether in 300 parts of water and 70 parts of 31% strength aqueous hydrochloric acid, and 40 parts of an aqueous 5N sodium nitrite solution are added dropwise. The reaction solution is stirred for a further 30 minutes, and excess nitrous acid is decomposed with a small amount of amidosulfonic acid. 60.8 parts of 2-naphthol-3,6-disulfonic acid are then added, the pH value of the coupling mixture is adjusted to about 6, and the disazo compound according to the invention is precipitated by means of sodium chloride, filtered off with suction, dried and ground.

A red powder (which contains electrolyte salts, predominantly sodium chloride) of alkali metal salt, predominantly the sodium salt, of the compound of the formula

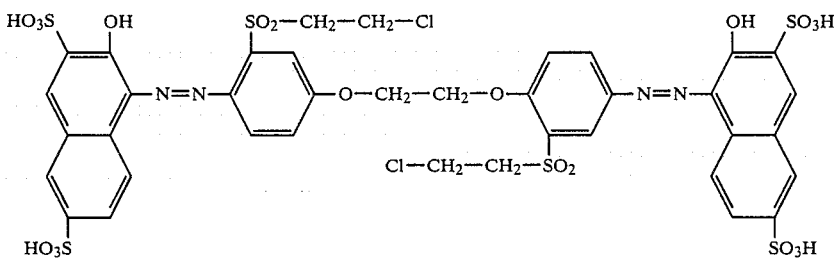

is obtained. This disazo compound according to the invention has very good dyestuff properties and produces by the application and fixing methods customary for fiber-reactive dyestuffs on cellulose fiber materials dyeings and prints having brilliant scarlet shades of high color yield and very good end-use and manufacturing fastness properties, such as, in particular, very good wet

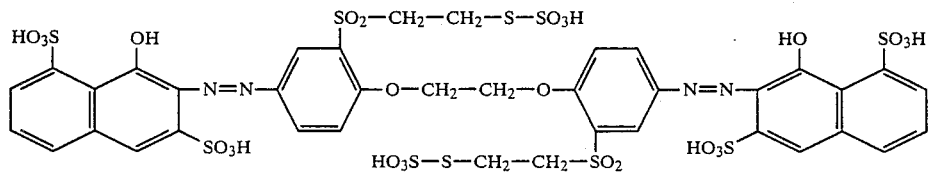

is obtained. The disazo compound according to the invention has very good dyestuff properties and produces by the application and fixing methods customary for fiber-reactive dyestuffs, for example, on cellulose materials dyeings and prints of high depth with clear neutral red shades of very good end-use and manufacturing fastness properties, such as, in particular, very good wet fastness properties. They are distinguished, in addition, by very good affinity and build-up capacity.

fastness properties.

EXAMPLE 17

150 parts of ice and 70 parts of 31% strength aqueous hydrochloric acid are added to a neutral solution of 62 parts of ethylene glycol bis-(4-amino-2-$\beta$-sulfatoethylsulfonylphenyl)ether in 250 parts of water, and the tetrazonium compound is formed by the dropwise addition of 40 parts of an aqueous 5N sodium nitrite solution. The reaction solution is stirred for a further 30 minutes, excess nitrous acid is decomposed, and an aqueous solution of the sodium salt of 102.7 parts of 1-[2,5-disulfo-4-(2,4-difluoro-5-chloropyrimid-6-ylamino)-phenyl]-3-methylpyrazol-5-one in 300 ml of water is then added. The pH value of the mixture is adjusted to 6.0 by means of sodium carbonate, and, after 2 hours, the disazo compound formed is salted out by means of sodium chloride, filtered off, dried and ground.

A dark, yellow-brown powder (which contains electrolyte salts, predominantly sodium chloride) of alkali metal salt, predominantly the sodium salt, of the compound of the formula the aid of their tetrazo components (diamino compounds) corresponding to the general formula (4a) or (4b)

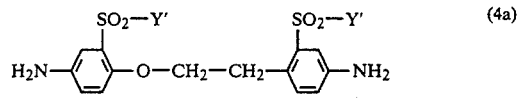 (4a)

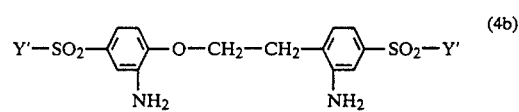 (4b)

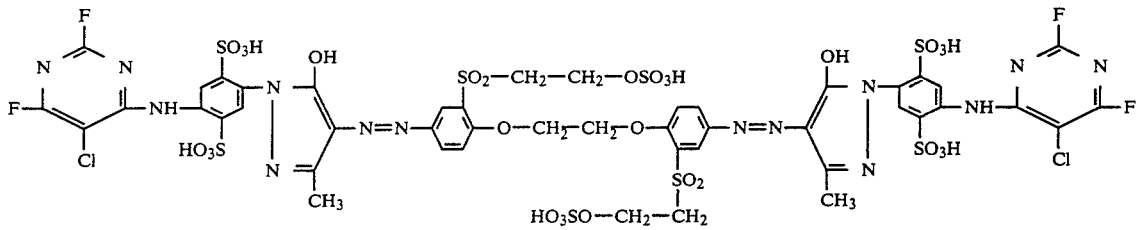

is obtained. This disazo compound according to the invention has very good dyestuff properties and dyes, for example, wool from a bath containing acetic acid in clear reddish yellow shades having excellent end-use and manufacturing fastness properties, such as, in particular, outstanding wet and very good light fastness properties. Using the application and fixing methods customary for fiber-reactive dyestuffs, deep golden yellow dyeings are obtained in a high dyeing yield on cellulose fiber materials in the presence of alkali. These dyeings likewise have very good end-use and manufacturing fastness properties, such as very good light and wet fastness properties.

EXAMPLES 18 TO 65

In the tabled examples below, further disazo compounds according to the invention are described with the aid of their tetrazo components (diamino compounds) and their coupling components (the general formulae ($K_1$) to ($K_{13}$) shown in the tabled examples, are listed after the table). These disazo compounds according to the invention can be prepared in a manner according to the invention, for example analogously to one of the above illustrative embodiments, from these components. They have very good fiber-reactive dyestuffs properties and produce, on the materials mentioned in the descriptive section, such as, in particular, cellulose fiber materials, by the application methods customary in industry in dyeing and printing, preferably by the application and fixing methods customary in industry for fiber-reactive dyestuffs, deep dyeings and prints having good fastness properties in the shade indicated in the particular tabled example.

| Example | Diamino compound of the formula | with Y' equal to | Coupling component H—K—R* of the formula | with R* equal to | Shade on cellulose |
|---|---|---|---|---|---|
| 18 | (4a) | β-sulfatoethyl | $K_1$ | acetyl | bluish red |
| 19 | (4a) | " | $K_1$ | benzoyl | " |
| 20 | (4a) | " | $K_2$ | acetyl | " |
| 21 | (4a) | " | $K_1$ | phenylaminocarbonyl | " |
| 22 | (4a) | β-(methylsulfonyl-oxy)-ethyl | $K_1$ | 4-chlorobenzoyl | " |
| 23 | (4a) | β-(amidosulfonyl-oxy)-ethyl | $K_2$ | (4-chlorophenyl)-amino-carbonyl | " |
| 24 | (4b) | β-sulfatoethyl | $K_2$ | acetyl | " |
| 25 | (4b) | " | $K_1$ | benzoyl | " |
| 26 | (4b) | " | $K_1$ | benzoyl | " |
| 27 | (4b) | " | $K_1$ | 2-chloro-4-(4'-β-sulfato-ethylsulfonylphenyl)-amino-1,3,5-triazin-6-yl | " |
| 28 | (4b) | β-sulfatoethyl | $K_3$ | acetylamino | scarlet |
| 29 | (4b) | " | $K_3$ | N—(β-chloropropionyl)-N—methylamino | " |
| 30 | (4b) | " | $K_3$ | sulfo | " |
| 31 | (4b) | " | $K_3$ | 2-chloro-4-(2' 5'-disulfo-phenyl)-amino-1,3,5-triazin-6-yl | " |
| 32 | (4b) | " | $K_1$ | 2-chloro-4-methoxy-1,3,5-triazin-6-yl | bluish red |
| 33 | (4a) | " | $K_3$ | N—methyl-N—(β-sulfatoethyl-sulfonyl)-amino | scarlet |
| 34 | (4a) | " | $K_1$ | 2-chloro-4-(N—methyl-N—phenyl)-amino-1,3,5-triazin-6-yl | bluish red |
| 35 | (4a) | " | $K_1$ | 2,3-dichloro-quinoxalin- | " |

-continued

| Example | Diamino compound of the formula | with Y' equal to | Coupling component H—K—R* of the formula | with R* equal to | Shade on cellulose |
|---|---|---|---|---|---|
| 36 | (4a) | " | K₁ | 2,4-dichloropyrimidin-6-yl 6-carbonyl | " |
| 37 | (4a) | " | K₄ | 2-methylsulfonyl-4-methyl-5-chloropyrimidin-6-yl-amino | red |
| 38 | (4a) | " | K₁ | 2-chloro-4-bis-[β-(β'-chloroethylsulfonyl)-ethyl]-amino-1,3,5-triazin-6-yl | bluish red |
| 39 | (4a) | | K₄ | N—methyl-N—[2-chloro-4-(2'-methyl-4'-sulfophenyl)-amino-1,3,5-trianzin-6-yl]-amino | red |
| 40 | (4a) | " | K₅ | 4-sulfophenyl | yellow |
| 41 | (4b) | " | K₅ | " | yellow |
| 42 | (4b) | " | K₅ | 6-sulfo-2-naphthyl | yellow |
| 43 | (4b) | " | K₆ | phenyl | golden yellow |
| 44 | (4b) | " | K₆ | methyl | yellow |
| 45 | (4b) | " | K₇ | sulfo | yellow |
| 46 | (4a) | " | K₅ | 2,5-dichloro-4-sulfophenyl | yellow |
| 47 | (4a) | " | K₈ | 4-sulfophenyl | greenish yellow |
| 48 | (4a) | " | K₉ | 4-[2'-chloro-4'-(2''-sulfophenyl)-amino-1',3',5'-triazin-6'-yl]-amino-2-sulfophenyl | golden yellow |
| 49 | (4a) | " | K₉ | 3,6-disulfo-2-naphthyl | yellow |
| 50 | (4a) | " | K₅ | 2-chloro-6-methyl-4-sulfophenyl | yellow |
| 51 | (4a) | " | K₅ | 3-sulfophenyl | yellow |
| 52 | (4a) | " | K₉ | 5-(2',4'-difluoro-5'-chloropyrimidin-6'-yl)-amino-2-sulfophenyl | yellow |
| 53 | (4a) | " | K₅ | 2,5-disulfophenyl | yellow |
| 54 | (4a) | " | K₉ | 4-[2'-chloro-4'-(β-sulfato-ethyl)-amino-1',3',5',6'-yl]-amino-2,5-disulfophenyl | golden yellow |
| 55 | (4a) | " | K₁₀ | β-sulfato-ethylamino | golden yellow |
| 56 | (4a) | " | K₁₁ | 2-methoxy-5-methyl-4-sulfophenyl | yellow |
| 57 | (4a) | " | K₁₁ | 4,8-disulfo-2-naphthyl | yellow |
| 58 | (4a) | " | K₁₁ | 2-chloro-6-methyl-4-sulfophenyl | yellow |
| 59 | (4a) | " | K₁₁ | 2-methoxy-5-sulfophenyl | yellow |
| 60 | (4a) | " | K₁₁ | 4-[2'-chloro-4'-(3''-sulfophenyl)-amino-1',3',5'-triazin-6'-yl]-amino-2,5-disulfophenyl | yellow |
| 61 | (4a) | " | K₁₁ | 4-[2'-fluoro-4'-(3''-sulfophenyl)-amino-1',3',5'-triazin-6'-yl]-amino-3-sulfophenyl | yellow |
| 62 | (4a) | " | K₁₂ | 5-sulfo | orange |
| 63 | (4a) | " | K₁₃ | 6-sulfo | scarlet |
| 64 | (4a) | " | K₁₃ | 3,6-disulfo | scarlet |
| 65 | (4a) | " | K₁₂ | 4,8-disulfo | orange |

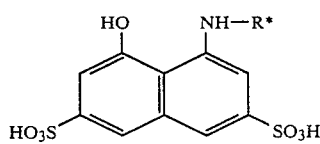

(K₁)

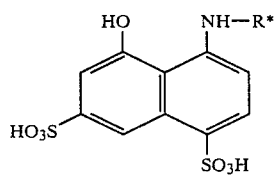

(K₂)

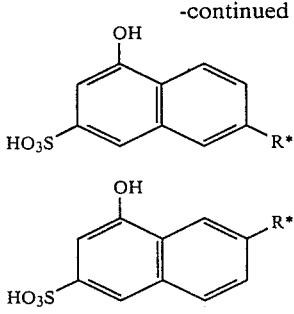

(K₃)

(K₄)

-continued

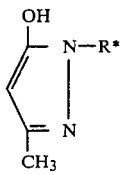 (K₅)

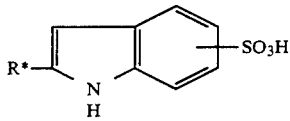 (K₆)

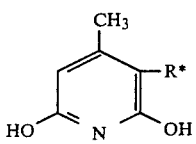 (K₇)

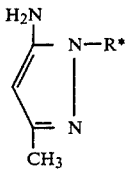 (K₈)

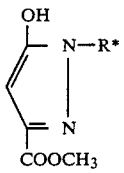 (K₉)

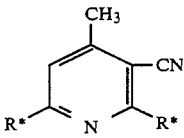 (K₁₀)

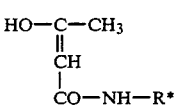 (K₁₁)

 (K₁₂)

-continued

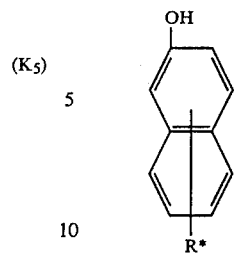 (K₁₃)

EXAMPLE 66

By following the instructions of Example 13 the solution described there of the tetrazonium salt of ethylene glycol bis-(4-amino-2-vinylsulfonylphenyl)ether is prepared, and this solution is then adjusted by means of sodium carbonate to a pH value between 4.0 and 4.5 and allowed to flow, with stirring, into a solution of 63.8 parts of the disodium salt of 1-amino-8-naphthol-3,6-disulfonic acid in 200 parts of water while a pH value between 8.2 and 8.5 is simultaneously adjusted and maintained by means of sodium carbonate. The coupling batch is stirred for a while longer at this pH value until the coupling reaction is complete, the pH is then adjusted to a value of 6.5 by means of dilute aqueous hydrochloric acid, the batch is cooled down to 10° C., 40.6 parts of cyanuric chloride are added, and stirring of the batch is continued at a pH value of 5.5 until the acylation reaction is complete. The synthesis solution is then subjected to a clarification filtration, and 38.1 parts of aniline-3-sulfonic acid are added to the filtrate. The pH is still maintained at a value of 5.5 by means of sodium carbonate, and the temperature of the reaction batch is increased to 50° C. The second acylation reaction is continued at 50° C. and at a pH value between 5.5 and 6.0 for a further 2 hours; it is then complete.

The disazo compound according to the invention thus prepared, which corresponds to the disazo compound of Example 13, is isolated in a customary manner, for example as described in Example 13. It has the same good application properties and fastness properties as the disazo compound according to the invention prepared according to Example 13.

We claim:
1. A diamino compound of the formula

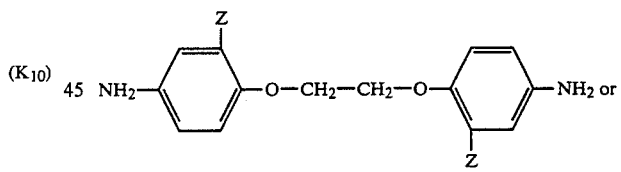

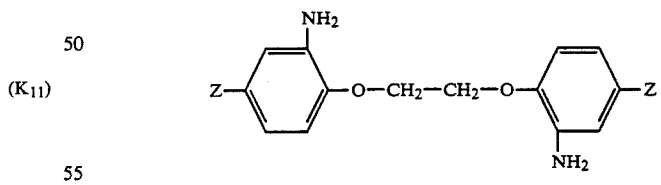

in which both Z substituents are identical and each is β-hydroxyethylsulfonyl, β-chloroethylsulfonyl, β-sulfatoethylsulfonyl, β-phosphatoethylsulfonyl, β-(lower alkylsulfonyloxy)-ethylsulfonyl, β-(arylsulfonyloxy)-ethylsulfonyl, vinylsulfonyl, β-thiosulfatoethylsulfonyl, β-phenoxyethylsulfonyl and β-(dialkylamino)-ethylsulfonyl.

2. A diamino compound accoding to claim 1, wherein the two amino groups are here bonded to the benzene nuclei in the para-position relative to the ethylenedioxy substituent.

3. A diamino compound according to claim 1 or 2, wherein the two Z's represent here the β-sulfatoethylsulfonyl group or the vinylsulfonyl group.

* * * * *